United States Patent [19]

Garcia et al.

[11] Patent Number: 4,525,516

[45] Date of Patent: Jun. 25, 1985

[54] HALOGENATED ORGANIC PEROXIDES IN FLAME RETARDANT ETHYLENE POLYMER COMPOSITIONS

[75] Inventors: Rodrigo A. Garcia, Houston, Tex.; Robert J. Martinovich, Bartlesville, Okla.

[73] Assignee: Phillips Petroleum Company, Bartlesville, Okla.

[21] Appl. No.: 585,665

[22] Filed: Mar. 2, 1984

Related U.S. Application Data

[63] Continuation of Ser. No. 462,849, Feb. 1, 1983, abandoned.

[51] Int. Cl.$^3$ .............................................. C08K 5/14
[52] U.S. Cl. .................................. 524/380; 264/310; 524/411; 524/467
[58] Field of Search ............... 524/410, 411, 412, 380, 524/371, 373, 467, 469; 525/387; 568/560; 521/96; 264/211, 310

[56] References Cited

U.S. PATENT DOCUMENTS

| | | | |
|---|---|---|---|
| 2,501,966 | 3/1950 | Rust et al. | 568/560 |
| 2,501,967 | 3/1950 | Vaughan et al. | 568/560 |
| 2,938,012 | 5/1960 | Filar | 568/560 |
| 3,079,370 | 2/1963 | Precopio et al. | 525/387 |
| 3,304,332 | 2/1967 | Bafford | 568/560 |
| 3,385,819 | 5/1968 | Gouinlock | 524/467 |
| 3,511,796 | 5/1970 | Wright | 521/96 |
| 3,738,866 | 6/1973 | Martens | 428/461 |
| 3,755,464 | 8/1973 | Bafford | 525/387 |
| 3,766,136 | 10/1973 | Howell et al. | 521/96 |
| 4,038,248 | 7/1977 | Anderson | 524/373 |
| 4,115,508 | 9/1978 | Hughes | 264/310 |
| 4,223,169 | 9/1980 | Barda | 568/645 |
| 4,289,687 | 9/1981 | Hagiwara et al. | 524/467 |

OTHER PUBLICATIONS

Pyro Chek 77B Flame Retardant Additive Product Bulletin—Ferro Chemical Division of Ferro Chemical Corporation.

Modern Plastics Encyclopedia—vol. 49, 10A, Oct. 1972, pp. 456-458.

Encyclopedia of Chemical Technology, Kirk-Othmer, Third Edition, vol. 10, 384-395, 1980.

Encyclopedia of Polymer Science and Technology—John Wiley & Sons (N.Y., 1967), 18-24.

*Primary Examiner*—Veronica P. Hoke

[57] ABSTRACT

In accordance with this invention, the formation of bubbles in a composition of (a) ethylene polymer, (b) flame retardant system, and (c) peroxide is inhibited or eliminated by employing as the peroxide a halogenated organic peroxide.

18 Claims, No Drawings

HALOGENATED ORGANIC PEROXIDES IN FLAME RETARDANT ETHYLENE POLYMER COMPOSITIONS

This is a continuation of application Ser. No. 462,849, filed Feb. 1, 1983 now abandoned.

This invention relates to new compositions of matter and to a method for inhibiting the formation of bubbles in compositions containing ethylene polymer and a flame retardant system.

BACKGROUND OF THE INVENTION

Over the years there has been a tremendous growth in the use of plastics to produce a variety of consumer goods and industrial products. Such materials lend themselves to different production methods and techniques. Frequently the production method is dictated by the particular article to be manufactured. For example, production of large plastic articles is accomplished for the most part by rotational molding, or at least the rotational molding process finds particular applicability in the production of large hollow products. Rotational molding is accomplished, for example, by supplying to a mold a measured amount of powdered thermoplastic moldable material and rotating the mold while heating it to fuse the thermoplastic powder and then cooling the mold to cause the molded article to solidify. Usually the mold is closed and is rotated around more than one axis, for example two axes at right angles, to distribute the powdered material throughout the mold to produce a completely closed article.

Ethylene polymers (homopolymers, copolymers, terpolymers, etc.) are used in rotational molding applications as well as numerous other applications. In many instances the ethylene polymers are compounded with various crosslinking agents (such as organic peroxides) which enhance the physical properties of the polymer, e.g. impact strength. Flame retardant systems comprised of a halogenated organic compound and an oxide of antimony are added to ethylene polymers to increase the resistance of the polymer to combustion. The combination of the peroxide crosslinking agent and the flame retardant system causes the undesirable formation of bubbles in the polymer. The bubbles are undesirable since they can be relatively large, e.g., up to about ½ inch in diameter or more, can extend to each surface of the walls and can terminate in pin holes or larger openings. As a result, articles produced from this type of polymer are unsuitable for many uses. Also, the appearance and the impact strength of the molded articles can be adversely affected by a large bubble population.

OBJECTS OF THE INVENTION

It is an object of this invention to inhibit the formation of bubbles in ethylene polymers.

It is an object of this invention to provide ethylene polymer compositions characterized by low or nonexistent bubble formation.

These objects and other objects and advantages of this invention will become apparent upon a study of this disclosure and the appended claims.

BRIEF SUMMARY OF THE INVENTION

In accordance with this invention, the formation of bubbles in a composition of (a) ethylene polymer, (b) flame retardant system, and (c) peroxide is inhibited or eliminated by employing as the peroxide a halogenated organic peroxide.

This invention is described further and more completely in the disclosure which follows.

DETAILED DESCRIPTION OF THE INVENTION

The composition of this invention contains (a) ethylene polymer, (b) flame retardant system, and (c) halogenated organic peroxide.

The term ethylene polymer is intended to include homopolymers, copolymers, terpolymers and the like of ethylene. Suitable ethylene polymers are described, for example, in the Encyclopedia of Polymer Science and Technology, Vol. 6, pages 275 to 454 and the Kirk-Othmer Encyclopedia of Chemical Technology, Third Edition, Vol. 16, pages 385-452. Included are those ethylene polymers having a low, intermediate or high density produced with a catalyst, for example, such as supported chromium oxide, titanium trichloride and triethylamuminum, etc.

Ethylene polymers other than homopolymers are included within the broad scope of this invention. Examples of such polymers include, but are not limited to, the following: ethylene/vinyl acetate copolymer, ethylene/1,3-butadiene copolymer, ethylene/propylene copolymer, ethylene/1-butene copolymer, ethylene/1-hexene copolymer and ethylene/1-octene copolymer. Preferably, such ethylene polymers contain at least about 80 wt % polymerized ethylene, the remainder constituting the comonomer(s).

The ethylene polymer employed in the composition can be of a single type or can be a combination of two or more types. An example of such a combination is the combination of linear (high density) polyethylene and ethylene/vinyl acetate copolymer. A myriad of other combinations exist.

The flame retardant system of relevance to this invention is comprised of a halogen-containing organic flame retardant and an oxide of antimony. The halogen-containing organic flame retardant can be any halogen-containing organic compound capable of decreasing the flammability of an ethylene polymer composition when employed alone or in combination with an oxide of antimony (such as, for example, antimony trioxide). Test procedures for determining flammability include, but are not limited to, ASTM D 568-77, ASTM E 162-76, UL-44, UL-796 and UL-94. The halogen-containing organic flame retardant can be, for example, a chlorinated and/or brominated organic compound. The perhalopentacyclodecane family ($C_{10}Cl_nBr_{12-n}H_{10}$) where n=8 to 12 is well suited for the purposes of this invention. One member of this family is perchloropentacyclodecane ($C_{10}Cl_{12}H_{10}$; n=12). Other suitable chlorinated and/or brominated organic compounds include, but are not limited to, the following:

decabromodiphenyl oxide
hexabromocyclodecane
1,2-bis(2,4,6-tribromophenoxy)ethane
3,5,6,8-tetrabromoacenaphthylene
1,3,5,6,8-pentabromoacenaphthylene
3,5,3',5'-tetrabromodiphenyl
COD-di Hex(Dechlorane Plus), $C_{18}H_{12}Cl_{12}$ (1,4,7,10-dimethanocycloocta-1,2,3,4,7,8,9,10,13,13,14,14-dodecachloro-1,4,4a,5,6,6a,7,10,10a,11,12,12a-dodecahydro[1,2,5,6]dibenzene), as disclosed in U.S. Pat. No. 3,385,819 at col. 3, line 74—col. 4, line 16 and having the trivial name perchloropentacyclodecane)

Pyro-Chek 77B (1,2-bis(pentabromophenoxy)ethane, as disclosed in U.S. Pat. No. 4,223,169 at col. 3, lines 56–59 and col. 24, lines 36–39).

In selecting a halogen-containing organic flame retardant one should take care that the compound has sufficient thermal stability to withstand the processing temperatures to which the ethylene polymer composition will be subjected. For example, if the composition is to be employed in a rotational molding operation, the halogen-containing organic flame retardant should have sufficient thermal stability to withstand typical rotational molding temperatures of about 425° F. to about 600° F.

The preferred oxide of antimony is antimony trioxide, $Sb_2O_3$. Antimony trioxide is preferred because its utility for this purpose has been repeatedly demonstrated and it is commercially available.

Flame retardant systems of the above-described type are known to persons of skill in the art. More information can be found, for example, in the Kirk-Othmer Encyclopedia of Chemical Technology, Third Edition, Vol. 10, pages 348 to 395.

The halogenated organic peroxide of this invention is characterized by the formula:

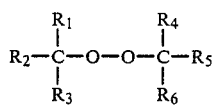

wherein $R_1$, $R_2$, $R_3$, $R_4$, $R_5$ and $R_6$ are independently selected from the following: H, alkyl group, aryl group, aralkyl group, halogenated alkyl group, halogenated aryl group and halogenated aralkyl group; wherein at least one of $R_1$, $R_2$, $R_3$, $R_4$, $R_5$ and $R_6$ contains a halogen such as, for example, Cl or Br. The above-defined formula includes, for example, the isomers of trichloro-di-t-butyl peroxide shown below.

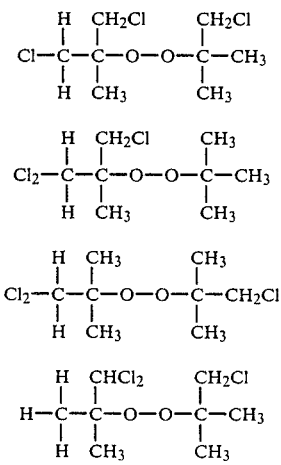

Arbitrarily selecting (4) above for purposes of illustration, it is noted that $R_2$, $R_3$, $R_5$ and $R_6$ are alkyl groups (i.e., methyl groups —$CH_3$) and that $R_1$ and $R_4$ are halogenated alkyl groups (i.e., chlorinated methyl groups —$CHCl_2$ and —$CH_2Cl$).

The trichloro-di-t-butyl peroxides are examples of the halogenated di-tertiary-alkyl peroxides. The halogenated di-tertiary-alkyl peroxides represent a class of halogenated organic peroxides especially well suited for the purposes of this invention. Examples include, but are not limited to, the following:

monochloro-di-t-butyl peroxide
monofluoro-di-t-amyl peroxide
monobromo-di-t-octyl peroxide
monochloro-t-butyl t-hexyl peroxide
dichloro-di-t-butyl peroxide (all isomers)
tetrachloro-di-t-butyl peroxide (all isomers).

Examples of other halogenated organic peroxides within the scope of this invention include, but are not limited to, the following:

t-amyl 3,4-dichlorocumyl peroxide
t-octyl 3,5,6-tribromocumyl peroxide
monochloro-t-butyl cyclohexyl peroxide
t-butyl 4-isopropyl-3,6-dibromocumyl peroxide.

More information concerning halogenated organic peroxides can be found, for example, in U.S. Pat. No. 2,501,967 and U.S. Pat. No. 3,755,464. These patents are incorporated by reference herein.

A single type of halogenated organic peroxide or a combination of two or more types of halogenated organic peroxides can be used. For example, a mixture of trichloro-di-t-butyl peroxide isomers can be used. Another example is a mixture of monobromo-di-t-octyl peroxide and t-amyl 3,4-dichlorocumyl peroxide. A myriad of other combinations exist.

The organic peroxide can be a chlorinated, brominated or fluorinated organic peroxide.

As broadly defined this invention includes any combination of (a) ethylene polymer, (b) flame retardant system (halogenated organic flame retardant and antimony oxide), and (c) halogenated organic peroxide. It is contemplated, however, that the composition will usually be in accordance with ranges provided below:

100 parts by weight ethylene polymer
5–80 parts by weight halogen-containing organic flame retardant
1–30 parts by weight antimony oxide
0.25–10 parts by weight halogenated organic peroxide.

In one narrower aspect of this invention, the ranges are as follows:

100 parts by weight ethylene polymer
15–50 parts by weight halogen-containing organic flame retardant
4–14 parts by weight antimony oxide
0.5–5 parts by weight halogenated organic peroxide.

The ranges given above are intended to reflect total content if a combination of two or more types of a given component are employed. For example, if two or more types of ethylene polymer are employed in the composition, it is the sum of these types that is used to reflect total ethylene polymer content. In similar manner, it is the total halogen-containing organic flame retardant content, total antimony oxide content and total halogenated organic peroxide content that should be used when preparing compositions in accordance with the ranges provided above.

Other additives can be included in the composition if desired. Examples of additives that can be optionally added to the composition include, but are not limited to, the following: colorants such as carbon black, stabilizers such as dilaurylthiodipropionate and UV absorbers such as 2-hydroxy-4n-octyloxybenzophenol.

The components of the composition of this invention and such other additives, as desired, can be combined to form a composition in accordance with conventional methods and means of compounding, mixing and blending. Persons of skill in the art possess the requisite knowledge. Relevant information can be found, for example, in the Encyclopedia of Polymer Science and Technology, Vol. 4, pages 118 to 128 and in the Kirk-Othmer Encyclopedia of Chemical Technology, Third Edition, Vol. 15, pages 604 to 637.

Although not limited thereto, the composition of this invention is especially well suited for use in rotational molding operations. The use of the previously-defined halogenated organic peroxide in the flame retardant-containing ethylene polymer eliminates, or at least inhibits, the formation of bubbles without adversely affecting other physical properties desirable for rotational molding applications. The examples which follow bear this out.

EXAMPLE 1

This example describes the compounding procedure employed to make the compositions of Examples 2 to 4.

The particulate components (e.g. polymers, flame retardant and antioxidant) were dry blended in a Henschel mixer. The blended particulate components and the remaining components (except for the organic peroxide) were mixed in an extruder at 375° F., a temperature above the melting point of the polyethylene component. The composition was extruded through a die to form a plurality of strands which were cooled and chopped into pellets. The desired quantity of peroxide was dry blended in a Henschel mixer with the pelleted first composition to form a composite. The composite was mixed in an extruder as before at a temperature above the melting point of the polyethylene but below the decomposition temperature of the organic peroxide. In the case of trichloro-di-t-butyl peroxide, the decomposition temperature is about 280°–310° F. The final product was pelletized for convenience for subsequent processing.

EXAMPLE 2

Two compositions, A and B, were prepared in the manner described in Example 1. The ethylene polymer was a linear high density polyethylene (HDPE) having a melt index of about 30 g/10 min. (as measured in accordance with ASTM D 1238) and a density of about 0.967 g/cc (as measured in accordance with ASTM D 1505). The flame retardant system consisted of Dechlorane Plus (a chlorinated hydrocarbon) and antimony trioxide. In composition A the organic peroxide was a mixture of trichloro-di-t-butyl peroxide isomers. In composition B the organic peroxide was 2,5-dimethyl-2,5-bis(t-butylperoxy)hexyne-3. Note that this latter peroxide is not halogenated and not within the scope of this invention. The compositions are set forth in Table I.

TABLE I

|  | Composition A | | Composition B | |
| --- | --- | --- | --- | --- |
|  | Parts by Weight | Weight Percent | Parts by Weight | Weight Percent |
| HDPE[1] | 100.0 | 69% | 100.0 | 69% |
| Dechlorane Plus[2] | 34.8 | 24% | 34.8 | 24% |
| Sb$_2$O$_3$[3] | 8.7 | 6% | 8.7 | 6% |
| TDBP[4] | 1.4 | 1% | — | — |
| DBBH[5] | — | — | 1.4 | 1% |

TABLE I-continued

|  | Composition A | | Composition B | |
| --- | --- | --- | --- | --- |
|  | Parts by Weight | Weight Percent | Parts by Weight | Weight Percent |
|  | 149.9 | 100% | 149.9 | 100% |

[1]Linear high density polyethylene available from Phillips Petroleum Co., Bartlesville, OK.
[2]A chlorinated hydrocarbon containing about 65 weight percent combined chlorine available from Hooker Chemical, Niagara Falls, N.Y. (see p.3, line 34)
[3]Antimony trioxide available from Asarco, Inc. of New York, New York.
[4]Trichloro-di-t-butyl peroxide isomers available from U.S. Peroxygen Division, Witco Chemical Corp. of Richmond, California.
[5]2,5-dimethyl-2,5-bis(t-butylperoxy)hexyne-3 available as Lupersol 130 from Lucidol Division, Pennwalt Corp., Buffalo, N.Y.

Hollow articles (i.e., jerry cans) containing ⅛ inch thick walls were rotationally molded from each composition at an oven temperature of 550° F. Inspection of wall sections cut from each molded composition indicated that composition A yielded bubble-free parts whereas composition B gave parts containing numerous bubbles. For this reason, the jerry cans made from composition B were not acceptable for commercial use.

EXAMPLE 3

Two compositions, C and D, were prepared in the manner described in Example 1. Two ethylene polymers were used in preparing the compositions. These polymers were linear high density polyethylene (HDPE) as described in Example 2 and ethylene/vinyl acetate copolymer (EVA). The flame retardant system consisted of Pyro-Chek 77B (a brominated aromatic compound) and antimony trioxide. Trichloro-di-t-butyl peroxide, as described in Example 2, was used as the organic peroxide. Dilauryl thiodipropionate (DLTDP) was employed as an antioxidant. The compositions are set forth in Table II.

TABLE II

|  | Composition C | | Composition D | |
| --- | --- | --- | --- | --- |
|  | Parts by Weight | Weight Percent | Parts by Weight | Weight Percent |
| HDPE[1] | 100.00 | 64.07 | 100.00 | 61.97 |
| EVA[2] | 15.60 | 9.99 | 16.10 | 9.98 |
| Pyro-Chek 77B[3] | 30.13 | 19.30 | 32.30 | 20.02 |
| Sb$_2$O$_3$[4] | 8.74 | 5.60 | 11.30 | 7.00 |
| TDBP[5] | 1.56 | 1.00 | 1.60 | 0.99 |
| DLTDP[6] | 0.06 | 0.04 | 0.07 | 0.04 |
|  | 156.09 | 100.00 | 161.37 | 100.00 |

[1]Linear high density polyethylene available from Phillips Petroleum Co.
[2]Ethylene/vinyl acetate copolymer containing 9.0 weight percent vinyl acetate; Vicat softening temperature = 75° C.; density = 0.930 g/cc (ASTM D 972); melt index = 7.0 (ASTM D 1238); available from DuPont de Nemours, E. I. DuPont Co., Wilmington, Delaware.
[3]Aromatic compound having 77 weight percent bromine; melting point = 322° C; available from Ferro Corp., Chemical Division, Bedford, Ohio.
[4]Antimony trioxide available from Asarco, Inc. of New York, New York.
[5]Trichloro-di-t-butyl peroxide isomers.
[6]Dilauryl thiodipropionate available from American Cyanamid, Bound Brook, N.J.

A portion of composition D was used to make ⅛ inch thick compression molded slabs of about 5"×5". Physical properties of the compression molded specimens were tested and are reported in Table III. A ¼ inch thick specimen was made in a similar manner and shape (5"×5") to test flammability.

TABLE III

|  | Test procedure | Composition D Value |
|---|---|---|
| Density, g/cc | ASTM D 1505 | 1.165 |
| Tensile, psi | ASTM D 638, 50 mm/min | 2,400 |
| Flexural modulus, psi | ASTM D 790 | 97,000 |
| Percent Elongation | ASTM D 638, 50 mm/min | 460 |
| Flammability Rating, ⅛ inch specimen | UL-94 | V-0 |
| ESCR, $F_{50}$, hrs. | ASTM D 1693 | >1,000 |
| Heat Distortion Temp. °F. at 66 psi | ASTM D 648 | 137 |
| Vicat Softening Point, °F. | ASTM D 1525 | 256 |

Compositions C and D were used to make rotationally molded boxes. Some of the boxes had nominal ⅛ inch thick walls and others had nominal ¼ inch thick walls. A McNeil model 200-32R1 rotational molding machine was employed to produce the rotationally molded boxes. The rotational molding conditions included oven temperatures ranging from 450° F. to 550° F. and residence time in the oven ranging from 9 to 28 minutes. The properties of the box sections were tested and are reported in Table IV and Table V.

TABLE IV

Physical Properties Based On Rotational Molded Box Sections[1]

|  | C(mold temp., minutes) | | D(mold temp., minutes) | |
|---|---|---|---|---|
|  | 500° F., 13 | 550° F., 13 | 550° F., 19 | 550° F., 13 |
| Percent Gel[2] | 73.0 | 70.8 | 75.0 | 77.0 |
| Tensile, psi[3] | 2650 | 2625 | 2450 | 2540 |
| Elongation, %[4] | 25 | 25 | 32 | 50 |
| Tensile Tear, psi[5] | 700 | 750 | 614 | 616 |
| Flex. Modulus, psi × $10^{-3}$[6] | 117.6 | 122.1 | 112.1 | 117.4 |
| ESCR, $F_{50}$, hrs.[7] | >1000 | >1000 | >1000 | >1000 |
| Burn Test[8] | | | | |
| ATB, sec | 8 | 38 | 30 | 30 |
| AEB, mm | 18 | 20 | 13 | 13 |
| Density, g/cc[9] | 1.14 | 1.14 | 1.17 | 1.14 |

[1] ⅛ inch thick wall, box dimensions about 6 × 6 × 12 inches.
[2] Amount of insoluble polymer remaining after extraction of a dry sample with boiling ethylbenzene for 16 hours.
[3] ASTM D 638, 50 mm/min.
[4] ASTM D 638, 50 mm/min.
[5] ASTM D 1004.
[6] ASTM D 790.
[7] ASTM D 1693
[8] ASTM D 568, ATB is actual time to burn, AEB is actual extent of burning.
[9] ASTM D 1505.

TABLE V

Dart Impact[1] Results At −20° F. (−29° C.) Foot-Pounds At Failure

| Composition | Box Wall Thickness | Molding Temp. °C. | Minutes At Molding Temperature | Impact Strength, Ft., Lbs. At Corresponding Minute[2] |
|---|---|---|---|---|
| C | ⅛ inch | 550 | 9, 11, 13 | 15, 15, 15 |
| D | ⅛ inch | 550 | 9, 11, 13 | 10, 5, 5 |
| C | ⅛ inch | 500 | 13, 15, 17, 19 | 20, 15, —, — |
| D | ⅛ inch | 500 | 13, 15, 17, 19 | —, 10, 10, 10 |
| C | ⅛ inch | 450 | 25 | — |
| D | ⅛ inch | 450 | 25 | 15 |
| C | ¼ inch | 500 | 17, 19, 21 | 50, 40, — |
| D | ¼ inch | 500 | 17, 19, 21 | 40, 30, 40 |
| C | ¼ inch | 450 | 21, 23, 25, 28 | 60, 60, —, — |
| D | ¼ inch | 450 | 21, 23, 25, 28 | 40, 40, 50, 40 |

[1] Dropped 10 pound dart-shaped steel bar with rounded tip of ½ inch radius on samples (rotational molded box sections) which had been conditioned in isopropanol at −20° F. at various heights, e.g., 1 foot, 2 feet, etc., until the test sample failed (shattered, cracked, etc.). The foot-pounds generated in the test at failure were then calculated and recorded.
[2] The blanks signify that no determination was made.

The results from Tables III, IV and V indicate that compositions C and D have the necessary properties for commercial use as containers or other compression molded or rotationally molded articles. From these results, it is concluded that the presence of the bubble-inhibiting trichloro-di-t-butyl peroxide does not adversely affect the quality of the product.

EXAMPLE 4

Composition D was further used to rotationally mold nominal two gallon capacity jerry cans having a nominal wall thickness of ⅛ inch. The limiting oxygen index of a specimen of the molded composition was determined to be 23.4 percent as measured in accordance with ASTM D 2863.

The impact property of the jerry cans containing 2.2 gallons of water at about 25° C. was found to be excellent. Cans containing the water did not rupture when dropped from a height of 30 feet.

In another impact test, cans containing 2.2 gallons of ethylene glycol conditioned at −20° F. withstood rupture when dropped from heights ranging from 12 to 15 feet.

We claim:
1. A composition comprising:
    (a) a ethylene polymer,
    (b) a flame retardant system, and
    (c) a chlorinated di-tertiary-alkyl peroxide;
wherein said flame retardant system is comprised of (i) at least one halogen-containing organic flame retardant selected from the group consisting of:
    1,4,7,10-dimethanocycloocta-1,2,3,4,7,8,9,10,13,13,14,14-dodecachloro-1,4,4a,5,6,6a,7.10,10a,11,12,12a-dodecahydro[1,2,5,6]dibenzene and 1,2 bis(pentabromophenoxy)ethane
and (ii) antimony oxide.
2. A composition according to claim 1 wherein said chlorinated di-tertiary-alkyl peroxide is a trichloro-di-t-butyl peroxide.
3. A composition according to claim 1 wherein said antimony oxide is antimony trioxide.
4. A composition according to claim 1 wherein said composition comprises per 100 parts by weight ethylene polymer the following:
    5–80 parts by weight halogen-containing organic flame retardant,
    1–30 parts by weight antimony oxide, and

0.25–10 parts by weight chlorinated di-tertiary-alkyl peroxide.

5. A composition according to claim 1 wherein said composition comprises per 100 parts by weight ethylene polymer the following:
   15–50 parts by weight halogen-containing organic flame retardant,
   4–14 parts by weight antimony oxide, and
   0.5–5 parts by weight chlorinated di-tertiary-alkyl peroxide.

6. A composition according to claim 1 wherein said ethylene polymer is ethylene homopolymer.

7. A method for producing a flame retardant, cross-linked, essentially bubble-free rotationally molded article comprising rotationally molding a composition comprising:
   (a) a ethylene polymer,
   (b) a flame retardant system, and
   (c) a chlorinated di-tertiary-alkyl peroxide;
wherein said flame retardant system is comprised of (i) at least one halogen-containing organic flame retardant selected from the group consisting of:
   1,4,7,10-dimethanocycloocta-1,2,3,4,7,8,9,10,13,13,14,14-dodecachloro-1,4,4a,5,6,6a,7.10,10a,11,12,12a-dodecahydro[1,2,5,6]dibenzene and 1,2 bis(pentabromophenoxy)ethane
and (ii) antimony oxide.

8. A method according to claim 7 wherein said composition is prepared by:
   (i) blending components (a), (b) and (c); and
   (ii) extruding the mixture prepared in (i) at a temperature above the melting point of component (a) and below the decomposition temperature of component (c) and chopping the extrudate into pellets.

9. A method according to claim 7 wherein said composition comprises per 100 parts by weight ethylene polymer the following:
   5–80 parts by weight halogen-containing organic flame retardant,
   1–30 parts by weight antimony oxide, and
   0.25–10 parts by weight chlorinated di-tertiary-alkyl peroxide.

10. A method according to claim 7 wherein said composition comprises per 100 parts by weight ethylene polymer the following:
   15–50 parts by weight halogen-containing organic flame retardant,
   4–14 parts by weight antimony oxide, and
   0.5–5 parts by weight chlorinated di-tertiary-alkyl peroxide.

11. A method according to claim 7 wherein said composition is prepared by:
   (i) blending components (a) and (b);
   (ii) extruding the mixture prepared in (i) at a temperature above the melting point of component (a) and chopping the extrudate into pellets;
   (iii) blending the pellets obtained in (ii) with component (c); and
   (iv) extruding the mixture prepared in (iii) at a temperature above the melting point of component (a) and below the decomposition temperature of component (c) and chopping the extrudate into pellets.

12. A method according to claim 7 wherein said article has a nominal wall thickness of at least about ⅛ inch.

13. The article produced in accordance with claim 7.
14. The article produced in accordance with claim 8.
15. The article produced in accordance with claim 9.
16. The article produced in accordance with claim 10.
17. The article produced in accordance with claim 11.
18. The article produced in accordance with claim 12.

* * * * *